March 29, 1960
C. F. LLOYD-YOUNG
2,930,567
EYEGLASS HOLDING SHELF
Filed Aug. 29, 1958
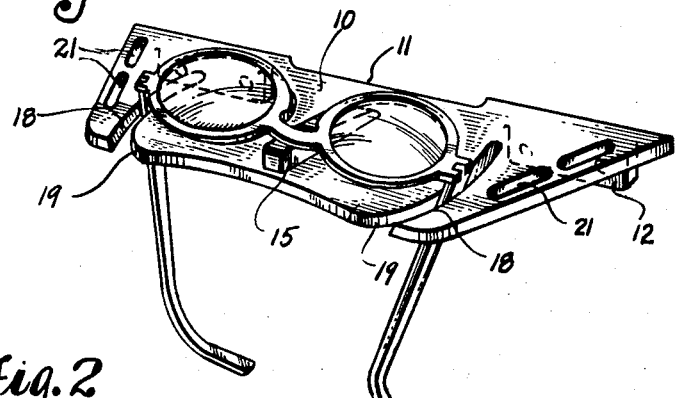
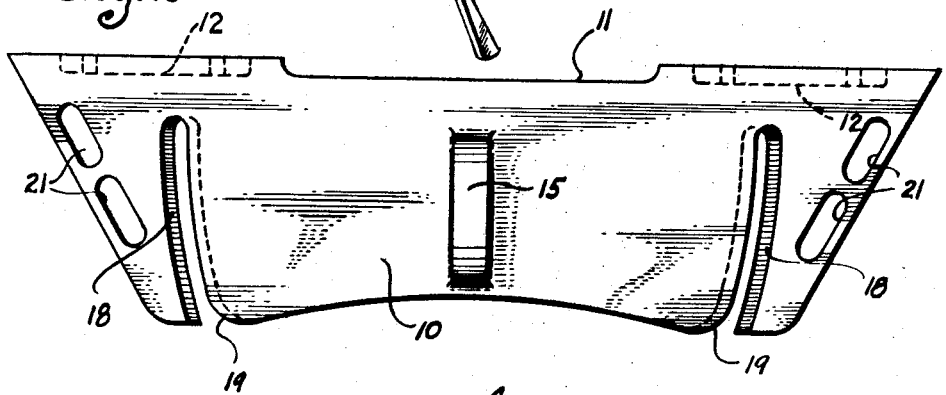
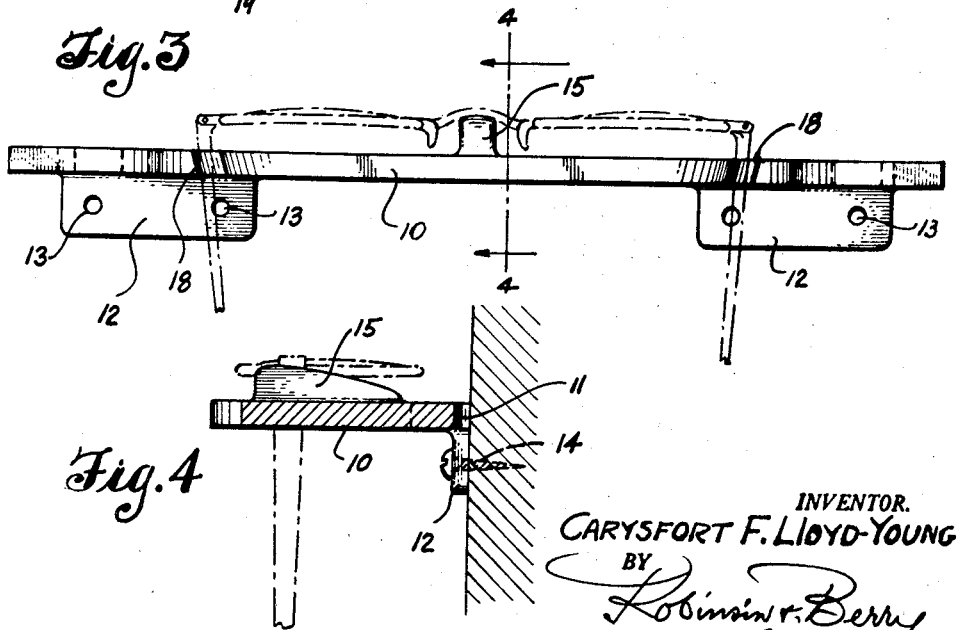
INVENTOR.
CARYSFORT F. LLOYD-YOUNG
BY
Robinson F. Berry
ATTORNEYS.

United States Patent Office 2,930,567
Patented Mar. 29, 1960

2,930,567

EYEGLASS HOLDING SHELF

Carysfort F. Lloyd-Young, Seattle, Wash.

Application August 29, 1958, Serial No. 757,966

1 Claim. (Cl. 248—309)

This invention relates to eyeglass holding shelves, and it has reference more particularly to a form of shelf on which a pair of eyeglasses, which may be of any of the conventional forms equipped with bows, and of various sizes may be safely held.

It is the principal object of the present invention to provide an eyeglass holding shelf, that is adapted to be secured to a wall surface, and is provided with slots, entering it from its forward edge designed to receive the bows of the glasses therein in such way, as the lens frame is placed on the shelf for support, as to frictionally retain the glasses against accidental displacement.

More specifically stated, the present invention resides in the provision of a small and easily attached shelf of the kind and character above stated wherein the bow receiving slots are of such width and are so spaced as to easily receive the bows of a pair of glasses, within the range of sizes for adults and children and which slots are so curved and their bounding edge surfaces so beveled that the bows when moved thereinto will engage them with an automatic binding or gripping action that retains the glasses against accidental displacement.

It is a further object of the invention to equip the shelf with an upstanding flange or ridge midway of the slots upon which the nose or bridge piece of the frame can be rested when the glasses are placed on the shelf to keep the lenses free of the shelf surface, and which flange also serves to resist accidental displacement of the glasses from the shelf.

It is also an object of the invention to equip the shelf for such uses as holding tooth brushes, contact lenses, and the like.

Still further objects and advantages of the invention reside in the details of construction of the various parts of the shelf; in their relationship to each other and in the mode of use of the shelf, as will herein after be fully described.

In accomplishing the above mentioned and other objects of the invention, I have provided the improved details of construction, the preferred forms of which are illustrated in the accompanying drawings, wherein:

Fig. 1 is a perspective view of an eyeglass holding shelf of a presently preferred form, embodied by the present invention, showing a pair of eyeglasses as held thereon.

Fig. 2 is a top view of the shelf, particularly illustrating the location, curvature and relationship of the bow receiving slots as provided therein.

Fig. 3 is a front view of the shelf.

Fig. 4 is a vertical section through the shelf, taken on line 4—4 in Fig. 3.

Referring more in detail to the drawings:

The preferred form of the present shelf is well shown in Figs. 2 and 3. Its size can be judged by comparison with the size of the eye glasses applied thereto in Fig. 1. Preferably the shelf is a one-piece molding of plastic, Lucite, Plexiglas, or the like, but may be made of any other suitable material. The device, as shown, comprises a flat, horizontal shelf portion proper, designated in its entirety by reference numeral 10; this shelf having a straight back edge that is recessed along its medial portion, as at 11, and having vertical flanges 12—12 formed along and flush with its rear edge beyond opposite ends of the recess, for the attachment of the shelf to a vertical wall surface. It is shown in Figs. 3 or 4 that the flanges 12—12 extend downwardly from the shelf and are formed with holes 13 for reception of attaching screws, or the like, 14, as shown in Fig. 4.

Formed on the top surface of the shelf, midway of its ends, and along a line that is perpendicular to its back edge, is an upstanding ridge or flange 15. This, as shown in Fig. 4, is higher at its forward end than at its rearward end and its top edge is transversely convex, as seen in Fig. 3 and it is slightly arched in its lengthwise direction. The forward end of the flange or ridge 15 is close to the forward edge of the shelf and its rear end is a short distance from the recess 11, as seen in Fig. 2.

Spaced laterally and equally from opposite sides of the flange 15 are the bow receiving slots 18—18 that open to the forward edge of the shelf and lead toward the back edge in a slightly curved direction; the open ends, or receiving ends of these slots are slightly closer together than their closed rearward ends, as has been shown in Fig. 2 and their inside edges merge into the forward edge of the shelf in rounded edges, as at 19 in Fig. 2, thus to facilitate the application of the bows thereto. The closed rearward ends of the slots terminate relatively close to the rear edge of the shelf. A feature of the two slots resides in the fact that their opposite side surfaces are slightly downwardly and inwardly beveled, as has been shown in Fig. 2, for a purpose presently explained.

It has also been shown, more particularly in Fig. 2, that the shelf 10 is formed near its opposite end edges and at the outside of the slots 18—18 with oblong holes 21 passing directly therethrough for purposes presently explained.

Assuming that the shelf is so formed, and that it is attached to a wall surface in a horizontal position, as has been indicated in Fig. 4, a pair of glasses can be easily and readily applied thereto as shown in Fig. 1. This application is most easily accomplished by grasping the two bows of the glasses in the two hands, with the bows directed downwardly and their hook ends curved toward the wall to which the shelf is attached.

Then the paired bows, grasped by their lower end portions and slightly downwardly converged, are applied directly into the open receiving ends of the slots 18—18, with the frames held somewhat above the level of the shelf, for example, a distance of from one to two inches. As they are moved back into the slots, they are lowered to engage the nose piece of the frames with the rearwardly sloping top edge of the flange 15. With this lowering, the bows are caused to bind against the side edges of the slot in such manner as to hold the glasses securely against accidental displacement from the shelf. This binding action may, and usually does have a tendency to bend the bows slightly toward each other, which is beneficial in that it compensates for the normal outward bending that is incident to wearing the glasses and which results in looseness especially when the bows are not equipped with the ear engaging hooks.

To remove the glasses from the shelf, it is only required that they be slightly lifted by grasping the frames or by lifting upwardly on the lower portions of the bows. The slight lifting loosens the grip of the slot edges on the bows and they can then be easily drawn forwardly from the slots.

The fact that the slots curve in the manner shown, adapts the shelf for the holding of glasses of small size, that is, for holding children's glasses, as well as for the wider glasses of adults particularly those having hearing aid bows.

Such shelves can be used advantageously in lavatories, since it is usually desired by persons wearing glasses, that they be removed for face washing, shaving and showering. Also, they can be advantageously used in automobiles for sunglasses; at bedside, or at other places where eyeglasses can be easily placed when not needed and then can be readily located when needed.

It has also been herein shown that the shelf is formed at its ends with the holes 21—21 into either of which a single bow of a pair of glasses might be received for support of glasses when more than one person is using the shelf.

Also, the holes 21—21 may be used for reception of the handle portions of tooth brushes or the like. Thus the shelf may be made useful for other purposes than holding eyeglasses.

Shelves of this character need not follow the specific design of the shelf as herein shown, but this design has been found to be quite practical, as well as ornamental. The essence of the invention resides in the provision of a shelf that is equipped with the forwardly opening slots and flange or ridge 15 in the relationship shown and in so designing the slots that the binding and holding action results from the proper application of the glasses to the shelf. The ridge 15 adds to the holding facility of the shelf and also supports the lenses of the glasses above the shelf surface.

Modifications in design, size, materials and mode of attachment may be changed to meet requirements. For example, the shelf may be adhesively secured or equipped with suction cups for that purpose. Also, it might be of semi-circular or triangular form to present two or more edge portions to which glasses might be applied.

What I claim as new is:

An eyeglass holding shelf comprising a thin, flat and horizontally disposed plate, equipped at its rear edge with flanges for its fixed mounting on a wall surface, and formed medially of its opposite ends with an upstanding rib directed thereacross at a right angle to its back edge, having a rearwardly and downwardly sloping top edge surface and said plate being formed at opposite sides of said rib at distances equally spaced therefrom, with slots leading into the shelf to near its back edge and designed to pass the bows of a glasses frame when the glasses are placed on the shelf with the nose piece thereof resting on the top edge of said rib and the frames held thereby spaced above the shelf, said slots having widened entrance mouths and being directed into the shelf along slightly diverging lines, and having parallel opposite side surfaces that are inwardly and downwardly beveled to produce a gripping effect on the contained bows.

References Cited in the file of this patent

UNITED STATES PATENTS

| | | |
|---|---|---|
| 1,581,250 | Treubig | Apr. 20, 1926 |
| 2,241,205 | Kimber | May 6, 1941 |
| 2,817,487 | Wantz | Dec. 24, 1957 |
| 2,875,805 | Flora | Mar. 3, 1959 |
| 2,884,220 | Manley | Apr. 28, 1959 |

FOREIGN PATENTS

| | | |
|---|---|---|
| 737,441 | Germany | July 14, 1943 |